US012574662B2

(12) United States Patent     (10) Patent No.:   US 12,574,662 B2

Higuchi et al.       (45) Date of Patent:    Mar. 10, 2026

(54) THRESHOLD VALUE DETERMINATION METHOD, THRESHOLD VALUE DETERMINATION PROGRAM, THRESHOLD VALUE DETERMINATION DEVICE, PHOTON NUMBER IDENTIFICATION SYSTEM, PHOTON NUMBER IDENTIFICATION METHOD, AND PHOTON NUMBER IDENTIFICATION PROCESSING PROGRAM

(71) Applicant: HAMAMATSU PHOTONICS K.K., Hamamatsu (JP)

(72) Inventors: Takafumi Higuchi, Hamamatsu (JP); Katsuhiro Nakamoto, Hamamatsu (JP); Teruo Takahashi, Hamamatsu (JP); Mao Nakajima, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 121 days.

(21) Appl. No.: 18/709,973

(22) PCT Filed: Nov. 10, 2022

(86) PCT No.: PCT/JP2022/041948

§ 371 (c)(1),
(2) Date: May 14, 2024

(87) PCT Pub. No.: WO2023/119934

PCT Pub. Date: Jun. 29, 2023

(65) Prior Publication Data

US 2025/0016476 A1    Jan. 9, 2025

(30) Foreign Application Priority Data

Dec. 24, 2021   (JP) ................................. 2021-211065

(51) Int. Cl.
*H04N 25/773*     (2023.01)
*H04N 25/618*     (2023.01)
*G01J 1/44*       (2006.01)

(52) U.S. Cl.
CPC ......... *H04N 25/773* (2023.01); *H04N 25/618* (2023.01); *G01J 1/44* (2013.01); *G01J 2001/442* (2013.01)

(58) Field of Classification Search
CPC .. H04N 25/773; H04N 25/618; H04N 25/616; H04N 25/76; H04N 25/60; G01J 1/44; G01J 2001/442
See application file for complete search history.

(56) References Cited

U.S. PATENT DOCUMENTS

| | | | | |
|---|---|---|---|---|
| 2012/0207216 A1* | 8/2012 | Yu | ........................ | H04N 19/147 375/E7.193 |
| 2019/0385280 A1 | 12/2019 | Huang et al. | | |

(Continued)

FOREIGN PATENT DOCUMENTS

| | | |
|---|---|---|
| JP | 2020-038129 A | 3/2020 |
| JP | 2020-096646 A | 6/2020 |

(Continued)

OTHER PUBLICATIONS

English-language translation of International Preliminary Report on Patentability (IPRP) dated Jul. 4, 2024 that issued in WO Patent Application No. PCT/JP2022/041948.

(Continued)

*Primary Examiner* — Mekonnen D Dagnew
(74) *Attorney, Agent, or Firm* — Faegre Drinker Biddle & Reath LLP

(57) ABSTRACT

A threshold value determination method includes a step of calculating a probability distribution of a provisional value for each photon number of a target pixel based on an (Continued)

observation probability for each photoelectron number based on a probability distribution of the photon number and an observation probability for each photoelectron number based on a probability distribution of the photoelectron number accompanying reading noise of the target pixel and a step of calculating threshold value data for sorting the provisional value into a corresponding photon number based on the probability distribution for each photon number.

18 Claims, 9 Drawing Sheets

(56) References Cited

U.S. PATENT DOCUMENTS

| | | | |
|---|---|---|---|
| 2020/0036918 A1* | 1/2020 | Ingle | H10F 39/8053 |
| 2024/0167871 A1* | 5/2024 | Eaton | G01J 1/44 |

FOREIGN PATENT DOCUMENTS

| | | |
|---|---|---|
| JP | 2020-167728 A | 10/2020 |
| JP | 2021-182751 A | 11/2021 |
| WO | 2017/080860 A1 | 5/2017 |
| WO | WO-2019/102636 A1 | 5/2019 |
| WO | WO-2019/102637 A1 | 5/2019 |

OTHER PUBLICATIONS

B. Saleh Masoodian et al., "A 1Mjot 1040fps 0.22e-rms Stacked BSI Quanta Image Sensor with Cluster-Parallel Readout", 2017 InternationalImage Sensor Workshop (IISW), May 30-Jun. 2, 2017, p. 230-p. 233.

Jia Ju Ma et al., "Photon-number-resolving megapixel image sensor at room temperature without avalanche gain", Optica, vol. 4, No. 12, Dec. 2017, p. 1474-p. 1481.

Dakota A. Starkey et al., Determining Conversion Gain and Read Noise Using a Photon-Counting Histogram Method for Deep Sub-Electron Read Noise Image Sensors, Journal of the Electron Devices Society, vol. 4, No. 3, May 2016, p. 129-p. 135.

Basden A. G. et al, "Photon counting strategies with low light level CCDs", arxiv.org, Cornell University Library, 201OLIN Library Cornell University Ithaca, NY14853 DOI: 10.1046/J.1365-8711.2003.07020.X, Jul. 16, 2003, p. 1-p. 7, XP080121741.

Patrick S. Michelberger, "Room temperature caesium quantum memory for quantum information applications", arxiv.org, Cornell University Library, 201OLIN Library Cornell University Ithaca, NY14853, Jun. 4, 2017, p. 1-p. 435, XP080767418

Tao Cheng et. al., "Wide spectrum denoising (WSD) for super-resolution microscopy imaging using compressed sensing and a high-resolution camera", arxiv.org, Cornell University Library, 201OLIN Library Cornell University Ithaca, NY14853, Jun. 8, 2020, p. 1-p. 13, XP081692991.

Jaromír Fiurásek et al, "Two-mode squeezing in Raman couplers", Journal of Optics B: Quantum and Semiclassical Optics, Institute of Physics Publishing, Bristol, GB,vol. 2,No. 1, DOI:10.1088/1464-4266/2/1/302, Feb. 1, 2000, p. 10-p. 20, XP020081563.

Yanqiang Guo et al, "Photon statistics and bunching of a chaotic semiconductor laser", arxiv.org, Cornell University Library, 201OLIN Library Cornell University Ithaca, NY14853 DOI: 10.1364/OE.26.005991, Feb. 27, 2018, p. 1-p. 10, XP081213190

Elisabeth Schlottmann et. al., "Exploring the Photon-Number Distribution of Bimodal Microlasers", arxiv.org, Cornell University Library, 201OLIN Library Cornell University Ithaca, NY14853, Sep. 13, 2017, p. 1-p. 6, XP080820799

Gert Finger et al, "Performance evaluation and calibration issues of large format infrared hybrid active pixel sensors used for ground- and space-based astronomy", Nuclear Instruments&Methods in Physics Research. Section A,Elsevier BV*North-Holland,NL,vol. 565,No. 1,DOI:10.1016/J.NIMA.2006.05.005, Sep. 1, 2006, p. 241-p. 250, XP005608346

European Search Report issued on Sep. 5, 2025 in corresponding European patent application 22910653.9.

* cited by examiner

THRESHOLD VALUE DETERMINATION METHOD, THRESHOLD VALUE DETERMINATION PROGRAM, THRESHOLD VALUE DETERMINATION DEVICE, PHOTON NUMBER IDENTIFICATION SYSTEM, PHOTON NUMBER IDENTIFICATION METHOD, AND PHOTON NUMBER IDENTIFICATION PROCESSING PROGRAM

TECHNICAL FIELD

The present disclosure relates to a threshold value determination method, a threshold value determination program, a threshold value determination device, a photon number resolving system, a photon number resolving method, and a photon number resolving processing program.

BACKGROUND ART

For example, a photon number resolving device using a complementary metal oxide semiconductor (CMOS) image sensor is described in Patent Literature 1 and Patent Literature 2. In this device, when photons are input to a photoelectric conversion element, photoelectrons generated based on the number of input photons are accumulated as electric charges. The electric charges accumulated in the photoelectric conversion element are converted to a voltage which is amplified by an amplifier. A voltage output from the amplifier is converted to a digital value by an A/D converter. In the photon number resolving device, the number of photons in a pixel of the image sensor is determined based on the digital value output from the A/D converter.

A technique of photon number resolving using a CMOS image sensor is described in Non-Patent Literatures 1 to 3.

CITATION LIST

Patent Literature

[Patent Literature 1] PCT International Publication No. WO2019/102636
[Patent Literature 2] PCT International Publication No. WO2019/102637
[Non-Patent Literature 1] B. Saleh Masoodian, Jiaju Ma, Dakota Starkey, Yuichiro Yamashita, and Eric R. Fossum, "A 1Mjot 1040 fps 0.22e-rms Stacked BSI Quanta Image Sensor with Cluster-Parallel Readout," 2017 International Image Sensor Workshop (IISW) Proceedings, May 30-Jun. 2, 2017, P 230-233
[Non-Patent Literature 2] JIAJU M A et al., "Photon-number-resolving megapixel image sensor at room temperature without avalanche gain," Optica, Vol. 4, No. 12, December 2017, p 1474-p 1481
[Non-Patent Literature 3] DAKOTA A. STARKEY et al., "Determining Conversion Gain and Read Noise Using a Photon-Counting Histogram Method for Deep Sub-Electron Read Noise Image Sensors," JOURNAL OF THE ELECTRON DEVICES SOCIETY, VOLUME 4, NO. 3, May 2016, p 129-p 135

SUMMARY OF INVENTION

Technical Problem

When photon number resolving is performed using the CMOS image sensor, reading noise which is random noise is generated in the amplifier at the time of reading the voltage amplified by the amplifier. When the reading noise is large, a probability distribution of the number of photoelectrons observed is broad. Accordingly, it is preferable that reading noise of each pixel be small. However, when the CMOS image sensor is manufactured, reading noise of pixels may fluctuate in a fixed range. In this case, there is concern about a decrease in counting accuracy of photons in a pixel with large reading noise.

An aspect of the present disclosure provides a threshold value determination method, a threshold value determination program, a threshold value determination device, and a photon number resolving system, a photon number resolving method, and a photon number resolving processing program that can curb a decrease in counting accuracy of photons.

Solution to Problem

A threshold value determination method according to an example is a method of deriving threshold value data for sorting a provisional value of a photon number in a target pixel which is one of a plurality of pixels in a corresponding photon number in a photon number resolving system. The photon number resolving system includes the plurality of pixels of which each includes a photoelectric conversion element for converting input light to electric charges and an amplifier for amplifying the electric charges converted by the photoelectric conversion element and converting the electric charges to a voltage, an A/D converter configured to convert a voltage output from the amplifier of each of the plurality of pixels to a digital value, and a deriving unit configured to derive the provisional value of the photon number in each of the plurality of pixels based on the digital value. The method includes a step of calculating a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel. The method includes a step of calculating threshold value data for sorting the provisional value into the integer n or the integer m based on the first probability distribution and the second probability distribution.

A threshold value determination program according to an example is a program causing a computer to perform a process of deriving threshold value data for sorting a provisional value of a photon number in a target pixel which is one of a plurality of pixels in a corresponding photon number in a photon number resolving system. The photon number resolving system includes the plurality of pixels of which each includes a photoelectric conversion element for converting input light to electric charges and an amplifier for amplifying the electric charges converted by the photoelectric conversion element and converting the electric charges to a voltage, an A/D converter configured to convert a voltage output from the amplifier of each of the plurality of pixels to a digital value, and a deriving unit configured to derive the provisional value of the photon number in each pixel of the plurality of pixels based on the digital value. The process of deriving threshold value data includes: a process of calculating a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel; and a process of calculating threshold value data for sorting the provisional value into the integer n or the integer m based on the first probability distribution and the second probability distribution.

A threshold value determination device according to an example includes: a plurality of pixels of which each includes a photoelectric conversion element for converting input light to electric charges and an amplifier for amplifying the electric charges converted by the photoelectric conversion element and converting the electric charges to a voltage; an A/D converter configured to convert a voltage output from the amplifier of each of the plurality of pixels to a digital value; a first deriving unit configured to derive a provisional value of a photon number in each pixel of the plurality of pixels based on the digital value; and a second deriving unit configured to derive threshold value data for sorting the provisional value of the photon number in a target pixel which is one of a plurality of pixels in a corresponding photon number. The second deriving unit includes: a probability deriving unit configured to calculate a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel; and a threshold value determining unit configured to determine threshold value data for sorting the provisional value into the integer n or the integer m based on the first probability distribution and the second probability distribution.

In the threshold value determination method, the threshold value determination program, and the threshold value determination device, threshold value data for sorting a provisional value of a target pixel derived by the photon number resolving system in a corresponding photon number is determined. For example, in a pixel with large reading noise, an error included in the derived provisional value may increase. In the method, program, and device, the first probability distribution and the second probability distribution are calculated based on the observation probability for each photoelectron number based on the probability distribution of the photon number and the observation probability for each photoelectron number based on the probability distribution of the photoelectron number accompanying the reading noise of the target pixel. The threshold value data is derived based on the first probability distribution and the second probability distribution. In this way, the threshold value data is derived in consideration of the magnitude of the reading noise in the target pixel. Accordingly, since an influence of the reading noise on deriving of the confirmed value can be decreased, it is possible to improve accuracy of photon number resolving.

For example, the integer m may satisfy m=n+1. With this configuration, a threshold value for distinguishing provisional values of which the photon numbers differ by "1" is derived.

For example, the observation probability for each photoelectron number based on the probability distribution of the photon number may be one of a poissonian distribution, a super-poissonian distribution, a sub-poissonian distribution, a photon number distribution in a multi-mode squeezed state, a Bose-Einstein distribution, a logarithmic normal distribution, a uniform distribution, and a mixed distribution.

For example, the first probability distribution and the second probability distribution may be derived based on a product of the observation probability for each photoelectron number based on the probability distribution of the photon number and the observation probability for each photoelectron number based on the probability distribution of the photoelectron number accompanying the reading noise of the target pixel. With this configuration, it is possible to appropriately describe the first probability distribution and the second probability distribution.

For example, the observation probability for each photoelectron number based on the probability distribution of the photon number may be derived based on the digital value when the light is input to a reference pixel which is at least one pixel of the plurality of pixels. With this configuration, since the observation probability is derived based on the digital value which is measured data, a light source for inputting light to the photoelectric conversion element is not selected.

A photon number resolving system according to an example includes: a plurality of pixels of which each includes a photoelectric conversion element for converting input light to electric charges and an amplifier for amplifying the electric charges converted by the photoelectric conversion element and converting the electric charges to a voltage; an A/D converter configured to convert a voltage output from the amplifier of each of the plurality of pixels to a digital value; a first deriving unit configured to derive a provisional value of a photon number in each pixel of the plurality of pixels based on the digital value; and a second deriving unit configured to derive a photon number corresponding to the provisional value based on threshold value data for sorting the provisional value of the photon number in a target pixel which is one of a plurality of pixels in a corresponding photon number. The threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

A photon number resolving method according to an example includes: a step of deriving a provisional value of a photon number in each of a plurality of pixels based on digital values corresponding to the plurality of pixels output from a two-dimensional image sensor including the plurality of pixels; and a step of deriving a photon number corresponding to the provisional value based on threshold value data for sorting the provisional value of the photon number in a target pixel which is one of a plurality of pixels in a corresponding photon number. The threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

A photon number resolving processing program according to an example is a program causing a computer to perform a photon number resolving process based on digital values corresponding to a plurality of pixels output from a two-dimensional image sensor including the plurality of pixels. The program causes the computer to perform: a process of deriving a provisional value of a photon number of each pixel of the plurality of pixels based on the digital values; and a process of deriving a photon number corresponding to the provisional value based on threshold value data for sorting the provisional value of the photon number in a target pixel which is one of a plurality of pixels in a corresponding photon number. The threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

In the photon number resolving system, the photon number resolving method, and the photon number resolving processing program, threshold value data for sorting a provisional value into a corresponding photon number is generated based on the observation probability for each photoelectron number based on the probability distribution of the photon number of light and the observation probability for each photoelectron number based on the probability distribution of the photoelectron number accompanying the reading noise of the target pixel. Accordingly, since an influence of the reading noise on deriving of the confirmed value can be decreased, it is possible to improve accuracy of photon number resolving.

Advantageous Effects of Invention

With the photon number resolving device and the photon number resolving method according to the aspect, it is possible to curb a decrease in counting accuracy of photons.

DESCRIPTION OF EMBODIMENTS

Hereinafter, an embodiment will be specifically described with reference to the accompanying drawings. For the purpose of convenience, substantially the same elements will be referred to by the same reference signs and description thereof may be omitted. In the following description, photon number resolving includes counting photoelectrons generated in each pixel of an image sensor or counting photons incident on each pixel of an image sensor. Photon number resolving includes detecting photoelectrons generated in each pixel of an image sensor or detecting photons incident on each pixel of an image sensor similarly to general single photon counting. A photon number resolving result (photon number resolving data) includes statistical data indicating the number of photoelectrons or the number of photons. The photon number resolving result includes an image indicating the number of photoelectrons or the number of photons in each pixel. This image may be a two-dimensional image or a one-dimensional image. Photon number resolving includes counting the number of photons in consideration of quantum efficiency (QE) of an image sensor.

Figure 1:
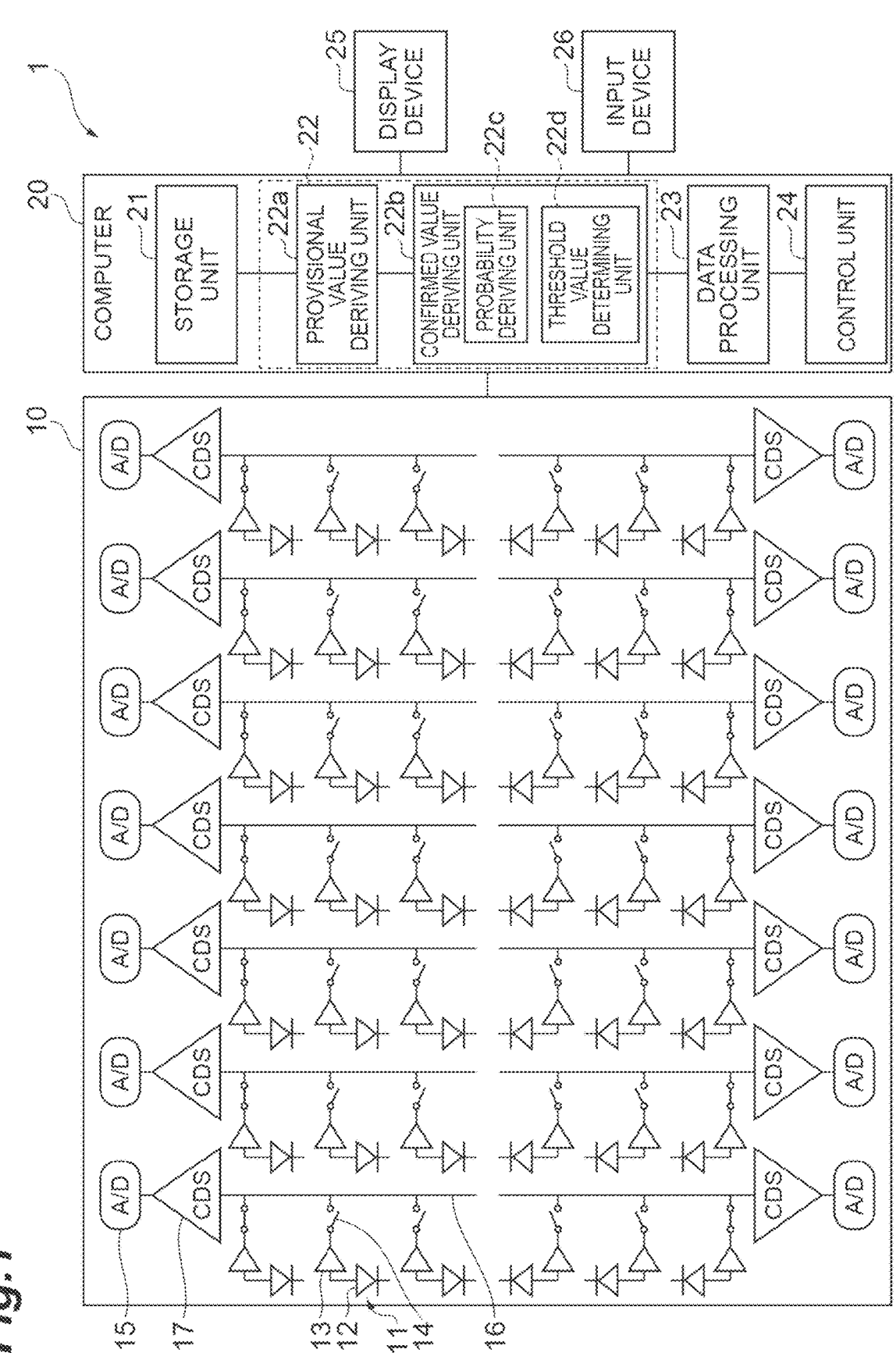
FIG. 1 is a diagram illustrating a configuration of a photon number resolving device according to an example.

FIG. 1 is a diagram illustrating a configuration of a photon number resolving device according to an example. As illustrated in FIG. 1, a photon number resolving device (a threshold value determination device, a photon number resolving system) 1 according to an example includes a CMOS image sensor 10 which is a two-dimensional image sensor and a computer (a control device) 20 connected to the CMOS image sensor 10. The CMOS image sensor 10 includes a plurality of pixels 11 and an A/D converter 15. The plurality of pixels 11 are two-dimensionally arranged. That is, the plurality of pixels 11 are arranged in a row direction and a column direction. Each pixel 11 includes a photodiode (a photoelectric conversion element) 12 and an amplifier 13. The photodiode 12 accumulates photoelectrons generated in response to inputting of photons as electric charges. The amplifier 13 converts the electric charges accumulated in the photodiode 12 to a voltage and amplifies the converted voltage. The amplified voltage is transferred to a vertical signal line 16 for each line (for each row) by switching a selection switch 14 of the corresponding pixel 11. A correlated double sampling (CDS) circuit 17 is provided in each vertical signal line 16. The CDS circuit 17 removes noise that varies between pixels, and temporarily stores the transferred voltage.

The A/D converter 15 converts the voltage output from the amplifier 13 of each of the plurality of pixels 11 to a digital value. The A/D converter 15 may be provided in each pixel 11. In this embodiment, the A/D converter 15 converts the voltage stored in the CDS circuit 17 to a digital value. The converted digital values are output to the computer 20. For example, the digital values may be sent to a horizontal signal line which is not illustrated by switching a selected column and output to the computer 20. In this way, the CMOS image sensor 10 outputs a digital value corresponding to the number of input photons (the number of generated photoelectrons) to the computer 20 when photons are input to each pixel 11. When the voltage amplified by the amplifier 13 is read, reading noise which is random noise is generated in the amplifier 13.

The computer 20 physically includes a storage device such as a RAM or a ROM, a processor (an arithmetic operation circuit) such as a CPU or a GPU, and a communication interface. For example, a personal computer, a cloud server, a smart device (such as a smartphone or a tablet terminal), a microcomputer, or a field-programmable gate array (FPGA) can be used as the computer 20. The computer 20 serves as a storage unit 21, a conversion unit 22, a data processing unit 23, and a control unit 24 by causing the processor of a computer system to execute a program stored in the storage device. The computer 20 may be provided inside of a camera device including the CMOS image sensor 10 or provided outside of the camera device. A display device 25 and an input device 26 may be connected to the computer 20. The display device 25 is, for example, a display that can display a result of photon number resolving acquired by the computer 20. The input device 26 may be a keyboard, a mouse, or the like for allowing a user to input measurement conditions. The display device 25 and the input device 26 may be provided as a touch screen. The display device 25 and the input device 26 may be included in the computer 20. The display device 25 and the input device 26 may be provided in the camera device including the CMOS image sensor 10.

The storage unit 21 stores data for converting a digital value output from the CMOS image sensor 10 to the number of photons. For example, the storage unit 21 includes an auxiliary storage device such as a solid state drive or a hard disk drive in addition to the storage device such as a RAM or a ROM. For example, the storage unit 21 stores a gain and an offset value in each of the plurality of pixels 11 as a lookup table. The storage unit 21 may store reading noise in each of the plurality of pixels 11 as a lookup table (a noise map).

A digital value [DN] output from the A/D converter 15 is expressed by the following Expression (1). Accordingly, the offset value [DN] is expressed as a digital value output in a state in which light is not input thereto. Therefore, for example, a plurality of digital values are acquired from a plurality of frames of dark images acquired by the CMOS image sensor 10 in a state in which light is not input thereto, and the offset value is acquired by averaging the acquired digital values for each pixel 11. When a gain [DN/e] of each pixel 11 is acquired, a plurality of frames of images are acquired by the CMOS image sensor 10 with sufficient light intensity. An average optical signal value S [SN] and a standard deviation N [DN] of the digital values for each pixel 11 are acquired. Since the gain is expressed by $N^2/S$, the gain is derived from the average optical signal value S and the standard deviation N.

[Math. 1]

$$\text{Digital value} = \text{gain} \times \text{number of photoelectrons } [e] + \text{offset value} \quad (1)$$

Reading noise is defined as fluctuation of a digital value and can be expressed, for example, as a value acquired by conversion in the units of electrons. Therefore, reading noise for each pixel 11 may be acquired by acquiring a standard deviation of digital values for each pixel 11 in a plurality of (for example, 100 or more frames) dark images and dividing the acquired standard deviation by the gain of the corresponding pixel 11. The offset value, the gain, and the reading noise of each pixel may be acquired in the course of manufacturing the photon number resolving device.

The conversion unit 22 converts the digital value for each of the plurality of pixels 11 output from the A/D converter 15 to the number of photoelectrons or the number of photons with reference to a table stored in the storage unit 21. For example, the number of photons can be acquired by dividing the number of photoelectrons for each pixel 11 by quantum efficiency. When the quantum efficiency is 100%, the number of photoelectrons and the number of photons are the same.

The data processing unit 23 prepares a two-dimensional image or a one-dimensional image indicating the number of photons in each pixel 11 based on the number of photons output from the conversion unit 22. For example, the two-dimensional image or the one-dimensional image may be an image in which pixels are displayed in luminance corresponding to the number of photons. The prepared image can be output to the display device 25. The data processing unit 23 may prepare statistical data such as a histogram which is a plot of the number of pixels with respect to the number of photons. The control unit 24 can comprehensively control the functional units of the computer 20 or the CMOS image sensor 10.

Figure 2:
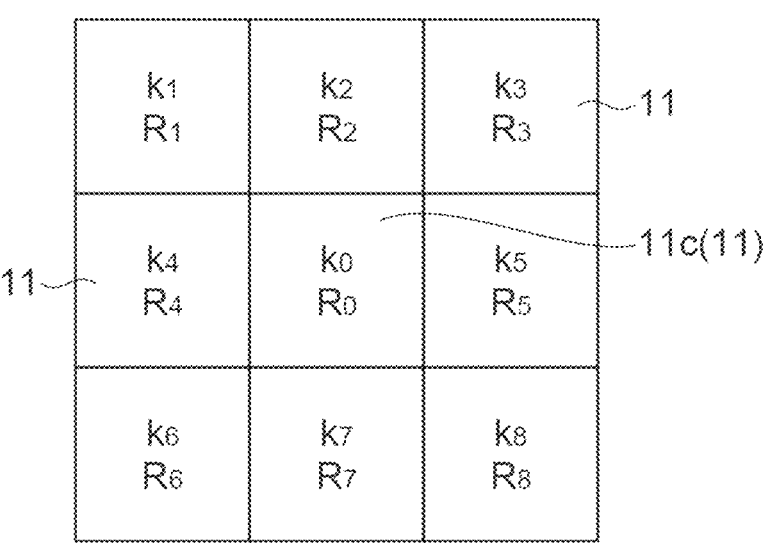
FIG. 2 is a diagram schematically illustrating a pixel group of 3 rows×3 columns.

The conversion unit 22 will be described below in detail. In description of the conversion unit 22, a pixel group of pixels arranged in 3 rows×3 columns may be referred to as a partial area of an image sensor including a plurality of pixels. FIG. 2 is a diagram schematically illustrating a pixel group of 3 rows×3 columns. In FIG. 2, reading noise corresponding to each pixel 11 of the pixel group is referred to by reference sign "$R_i$" (where i denotes a position of a pixel). The conversion unit 22 can appropriately acquire the gain, the offset value, and the reading noise of each pixel 11 with reference to the lookup table stored in the storage unit 21.

For example, the conversion unit 22 includes a provisional value deriving unit 22a (a first deriving unit) and a confirmed value deriving unit 22b (a second deriving unit). The provisional value deriving unit 22a derives a provisional value of the number of photons for each pixel 11 of a plurality of pixels 11 based on the digital value. The provisional value deriving unit 22a may derive the number of photoelectrons acquired by dividing a value obtained by subtracting the offset value from the measured digital value by the gain as the provisional value of the number of photons (a first provisional value) for each pixel 11 as in following Expression (2). In the following description, the first provisional value may be referred to as a pixel value.

[Math. 2]

$$\text{Pixel value} = ((\text{digital value} - \text{offset value})/\text{gain}) \quad (2)$$

The provisional value deriving unit 22a may derive an integer value of the number of photons estimated from the pixel value as a provisional value (a second provisional value). In the following description, the second provisional value may be referred to as a provisional photon number. For example, the provisional photon number may be acquired by rounding off the pixel value to a close integer. In this case, the pixel value may be converted to the provisional photon number by setting a predetermined threshold value range for the pixel value. For example, a threshold value range corresponding to 5 photoelectrons is equal to or greater than 4.5 e and less than 5.5 e. In FIG. 2, the provisional value (for example, the provisional photon number) in each pixel 11 of the pixel group is referred to by reference sign "$k_i$," (where i denotes a position of a pixel).

The confirmed value deriving unit 22b derives (determines) a confirmed value of the number of photons in each of the plurality of pixels 11. For example, the confirmed value deriving unit 22b sets one of the plurality of pixels 11 as a target pixel and derives a confirmed value of the number of photons in the target pixel. By setting each of the plurality of pixels constituting the two-dimensional image sensor as a target pixel, confirmed values of the numbers of photons in all the pixels are derived.

In this embodiment, the confirmed value deriving unit 22b derives a photon number corresponding to a provisional value as a confirmed value based on threshold value data for sorting a provisional value of a target pixel in a corresponding photon number. For example, the confirmed value deriving unit 22b includes a probability deriving unit 22c and a threshold value determining unit 22d in order to acquire threshold value data.

The probability deriving unit 22c derives a first probability and a second probability and derives a probability distribution of the number of photoelectrons in the target pixel for each photon number based on the derived first probability and the derived second probability. The first probability is an observation probability for each photoelectron number based on a probability distribution of the number of photons of light incident on the CMOS image sensor 10. The first probability is represented, for example, by following Expression (3). As represented by Expression (3), for example, the first probability is based on the probability distribution of the photoelectron number accompanying optical shot noise and conforms with a poissonian distribution.

[Math. 3]

$$\text{First probability} = \frac{\lambda^k \exp(-\lambda)}{k!} \quad (3)$$

In Expression (3), k denotes a photon number, and $\lambda$ denotes an average photon number. That is, the first probability is a probability (an observation probability) with which the photon number in the target pixel is observed to be k when the average photon number in the target pixel is $\lambda$. The first probability is calculated for each photoelectron number. The photon number k is a provisional photon number which is assumed by the probability deriving unit 22c. That is, the photon number k can be said to be a provisional value (a third provisional value) of the photon number in the target pixel. In the following description, the third provisional value may be referred to as an assumed photon number.

The average photon number (an average value) may be an average of the provisional values in neighboring pixels. The neighboring pixels can be defined as two or more pixels included in a partial area near the target pixel out of the plurality of pixels. In the example of the pixel group of 3 rows×3 columns illustrated in FIG. 2, a central pixel 11c may be defined as the target pixel and the pixel group of 3 rows×3 columns may be defined as the neighboring pixels. In this case, the average photon number in the target pixel may be an average value of the provisional values of the pixels 11 constituting the neighboring pixels. The provisional values of the neighboring pixels may be one of a pixel value and a provisional photon number.

For example, the probability deriving unit 22c may calculate a weighted average including reading noise of the neighboring pixels in a weight as the average photon number with reference to a noise map indicating reading noise in each of the plurality of pixels 11. A weight $w_i$ (where i indicates a position of the corresponding pixel) based on the reading noise is represented, for example, by following Expression (4). That is, the weight $w_i$ in the example may be a power of a reciprocal of the reading noise $R_i$. In this case, the provisional value is more likely to be reflected in the average photon number as the reading noise of a pixel becomes lower, and the provisional value is less likely to be reflected in the average photon number as the reading noise of a pixel becomes higher. In Expression (4), a reliability $\alpha$ can increase or decrease an influence of the reading noise on the weight $w_i$. That is, the influence of the reading noise on the weight $w_i$ becomes larger as the reliability $\alpha$ becomes larger. For example, $\alpha \geq 0$ is satisfied. When the value of the reliability $\alpha$ is excessively large, it is conceivable that a correct confirmed value be not derived. Therefore, for example, the reliability $\alpha$ may be less than 20. The reliability $\alpha$ may have a value which is set in advance by the probability deriving unit 22c or may have a value which can be set by a user of the photon number resolving device 1.

[Math. 4]

$$w_i = \left(\frac{1}{R_i}\right)^{\alpha} \quad (4)$$

The average photon number $\lambda$ based on the weighted average is represented by following Expression (5).

[Math. 5]

$$\lambda = \frac{\sum_i w_i \times k_i}{\sum_i w_i} \quad (5)$$

The second probability is an observation probability for each photoelectron number based on the probability distribution of the photoelectron number accompanying the reading noise in the target pixel. The second probability is represented by following Expression (6). As represented by Expression (6), the second probability conforms with a normal distribution (a Gaussian distribution). In Expression (6), x denotes a pixel value [e] of the target pixel, and R denotes the reading noise [e-rms] of the target pixel. That is, the second probability is a probability (an observation probability) with which the photon number in the target pixel is observed to be k at the provisional value (for example, the pixel value) of the target pixel. The second probability is calculated for each photoelectron number.

[Math. 6]

$$\text{Second probability} = \frac{1}{\sqrt{2\pi}R}\exp\left(-\frac{(x-k)^2}{2R^2}\right) \quad (6)$$

The probability deriving unit 22c calculates the probability distribution of the pixel value of the target pixel for each photoelectron number (photon number) based on a product of the first probability and the second probability. That is, the probability deriving unit 22c derives the probability distribution of the pixel value of the target pixel when the photon number of the target pixel is an assumed photon number. In other words, the probability deriving unit 22c derives the probability distribution of the pixel value of the target pixel when the photon number of the target pixel is an integer n (where n is equal to or greater than zero) and the probability distribution of the pixel value of the target pixel when the photon number of the target pixel is an integer m (where m is equal to or greater than zero and is not equal to n).

When the first probability is defined as $Q_k$, the probability distribution $P_k(x)$ of the pixel value of the target pixel derived by the probability deriving unit 22c is represented by Expression (7).

[Math. 7]

$$P_k(x) = Q_k \times \frac{1}{\sqrt{2\pi} R} \exp\left(-\frac{(x-k)^2}{2R^2}\right) \quad (7)$$

Figure 3:
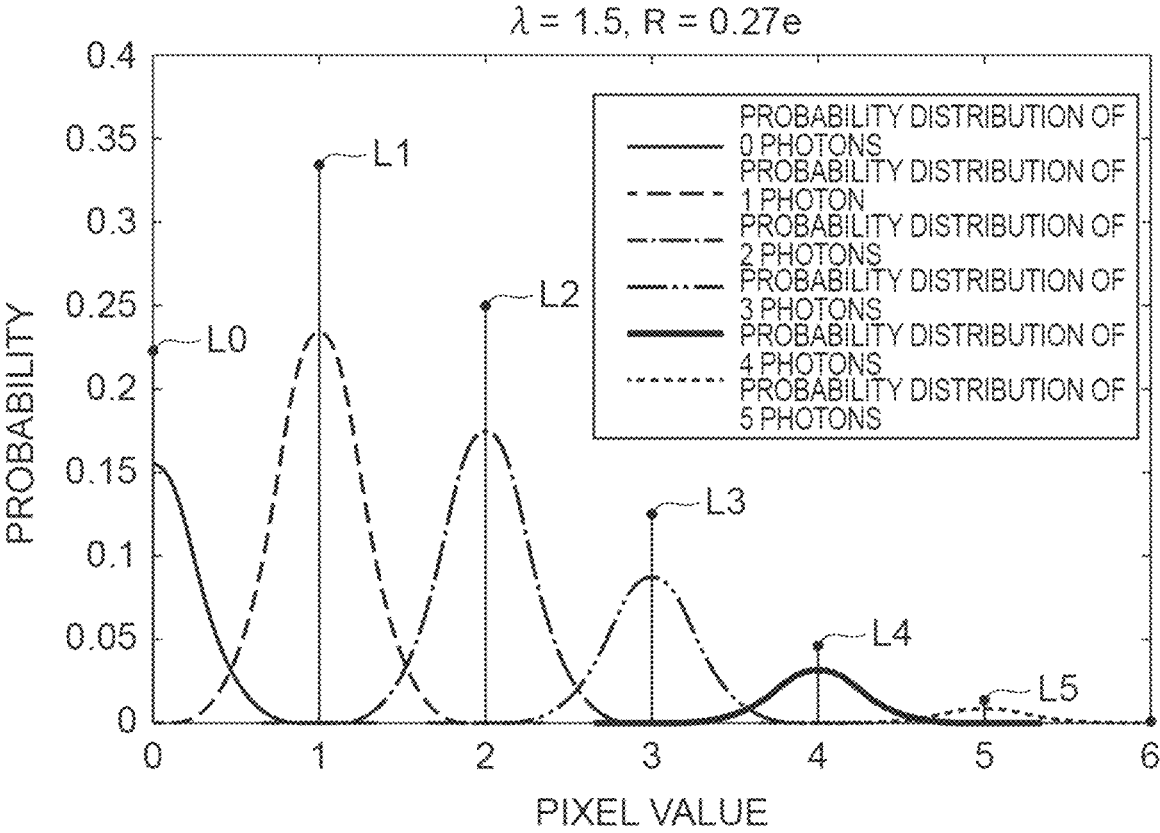
FIG. 3 is a diagram illustrating a probability distribution of a photoelectron number.

FIG. 3 is a diagram illustrating an example of the probability distribution $P_k(x)$ when the first probability $Q_k$ conforms with a poissonian distribution in which the average photon number $\lambda$ is 1.5 and the reading noise R is 0.27 [e-rms]. In FIG. 3, the probability distribution of the pixel value of the target pixel is drawn for each corresponding photon number (photoelectron number). That is, the probability distribution of the pixel value of the target pixel is drawn when the photon number of the target pixel is 0, 1, 2, 3, 4, and 5. The first probabilities when the photon number is 0, 1, 2, 3, 4, and 5 are indicated by solid lines L0, L1, L2, L3, L4, and L5 in FIG. 3.

The threshold value determining unit 22d determines threshold value data for sorting a provisional value of a target pixel in a corresponding photon number based on the probability distribution derived by the probability deriving unit 22c. In other words, the threshold value determining unit 22d determines threshold value data for determining whether the photon number of corresponding to the pixel value is an integer n or an integer m. When the integer m is equal to n+1, the threshold value data is a threshold value for distinguishing pixel values which are different by "1" photon number.

When the probability distribution $P_k(x)$ of a pixel value of a target pixel is represented by Expression (7), the threshold data is derived by calculating an intersection of the probability distribution $P_{kn}(x)$ of an assumed photon number $k_n$ and the probability distribution $P_{km}(x)$ of an assumed photon number $k_m$. That is, the threshold value data for determining whether the photon number corresponding to the pixel value is an integer n or an integer m can be determined by solving an equation $P_{kn}(x)=P_{km}(x)$ with respect to x. For example, the threshold value determining unit 22d acquires the threshold value data for determining whether the photon number corresponding to the pixel value is an integer n or an integer m by assuming a solution x in this case to be $T(k_n, k_m)$ and calculating $T(k_n, k_m)$ for all combinations of the assumed photon numbers.

Figure 4:
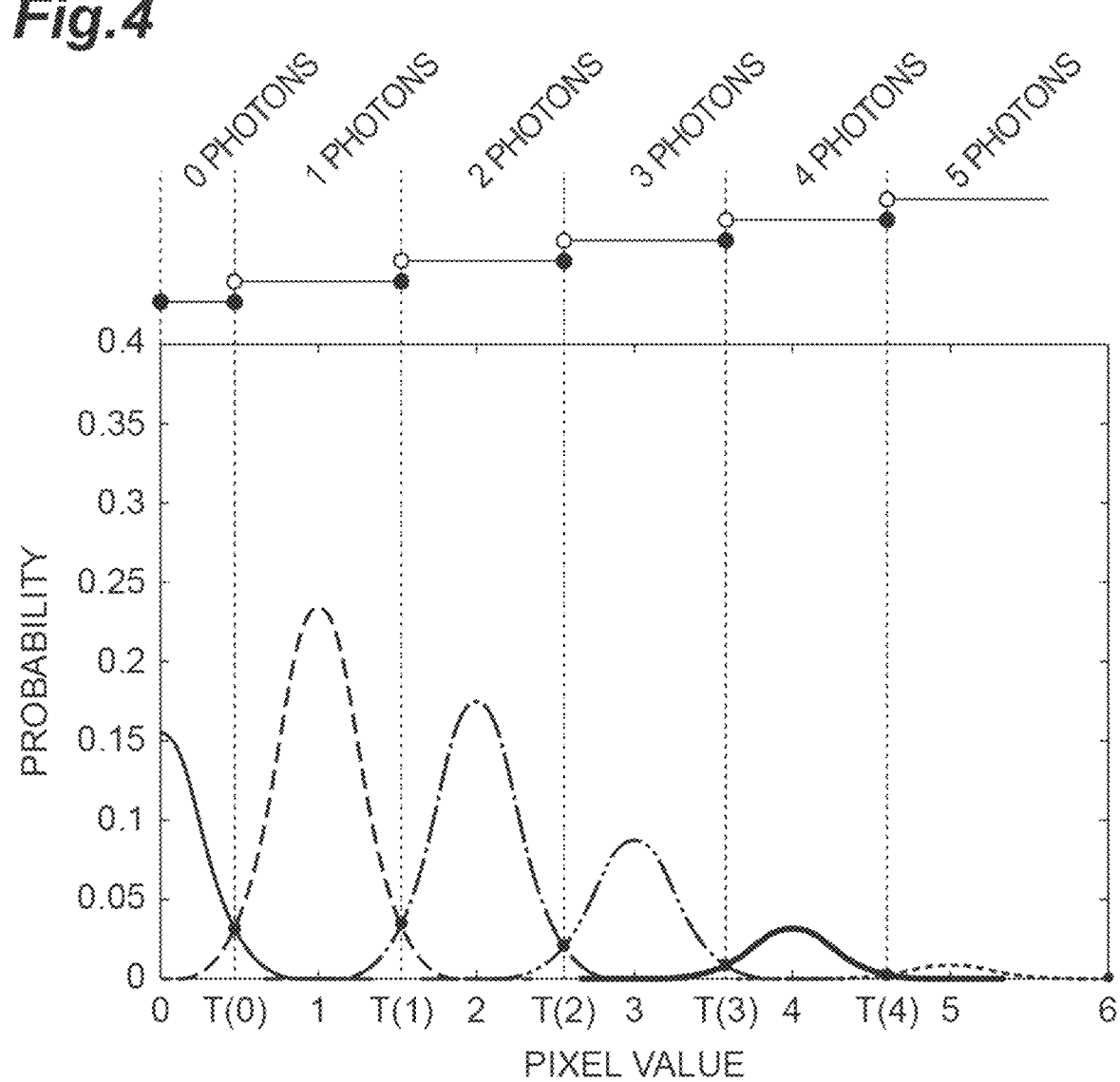
FIG. 4 is a diagram schematically illustrating a confirmed value deriving unit according to an example.

FIG. 4 is a diagram schematically illustrating an example of an approach to the threshold value data corresponding to the probability distribution illustrated in FIG. 3. In FIG. 4, positions of the threshold value T determined based on the threshold value data are indicated by dotted lines, and the photon numbers corresponding to threshold value ranges are illustrated. The threshold value determining unit 22d may acquire, for example, a combination of a threshold value range and the photon number corresponding to the threshold value range as threshold value data. In FIG. 4, an example in which a relationship between the integer n and the integer m satisfies m=n+1 and n<m is illustrated. Here, threshold value data $T(k_n, k_m)$ for distinguishing the photon number n and the photon number n+1 is defined as T(n). In this case, a range $T(n-1)<x\leq T(n)$ is a threshold value range corresponding to a pixel value sorted in the photon number n. At a pixel value x in the range, the value of the probability $P_k(x)$ with the photon number n is the maximum. Here, when n=0, T(−1)=0 is established, and the threshold value range in which the photon number is 0 is defined as $0\leq x\leq T(0)$. Each threshold value range may be defined as $T(n-1)\leq x<T(n)$.

Figure 5:
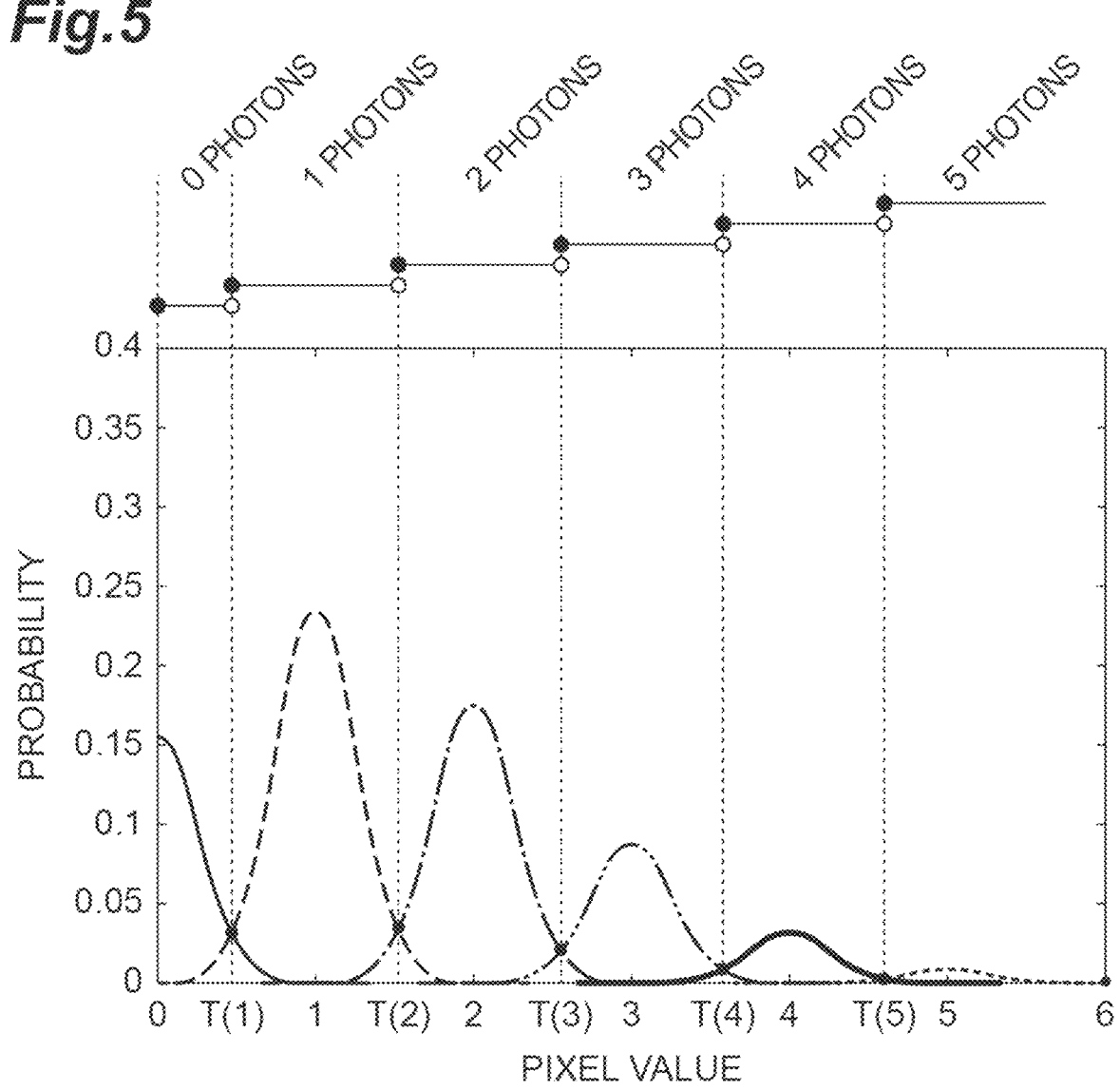
FIG. 5 is a diagram schematically illustrating a confirmed value deriving unit according to an example.

FIG. 5 is a diagram schematically illustrating another example of an approach to the threshold value data corresponding to the probability distribution illustrated in FIG. 3. In FIG. 5, an example in which the relationship between the integer n and the integer m satisfies m=n−1 and m<n is illustrated. Here, threshold value data $T(k_m, k_n)$ for distinguishing the photon number n−1 and the photon number n is defined as T(n). In this case, a range $T(n)\leq x<T(n+1)$ is a threshold value range corresponding to a pixel value sorted in the photon number n. At a pixel value x in the range, the value of the probability $P_k(x)$ with the photon number n is the maximum. Here, when n=0, T(0)=0 is established, and the threshold value range in which the photon number is 0 is defined as $0\leq x<T(1)$. Each threshold value range may be defined as $T(n)<x\leq T(n+1)$.

As described above, the threshold value T(n) corresponds to an intersection between the probability distribution $P_{kn}(x)$ and the probability distribution $P_{km}(x)$. In FIG. 4, the threshold value T(1) is a threshold value for distinguishing a pixel value in which the confirmed value of the photon number is 1 and a pixel value in which the confirmed value of the photon number is 2. The threshold value T(1) corresponds to an intersection between the probability distribution of 1 photon and the probability distribution of 2 photons. The threshold value T(2) is a threshold value for distinguishing a pixel value in which the confirmed value of the photon number is 2 and a pixel value in which the confirmed value of the photon number is 3. The threshold value T(2) corresponds to an intersection between the probability distribution of 2 photons and the probability distribution of 3 photons. In the range of from the threshold value T(1) to the threshold value T(2), since the probability distribution $P_k(x)$ for 2 photons is the maximum, the photon number corresponding to the pixel value is 2. In FIG. 5, the threshold value T(1) is a threshold value for distinguishing a pixel value in which the confirmed value of the photon number is 0 and a pixel value in which the confirmed value of the photon number is 1. The threshold value T(1) corresponds to an intersection between the probability distribution of 0 photons and the probability distribution of 1 photon. The threshold value T(2) is a threshold value for distinguishing a pixel value in which the confirmed value of the photon number is 1 and a pixel value in which the confirmed value of the photon number is 2. The threshold value T(2) corresponds to an intersection between the probability distribution of 1 photon and the probability distribution of 2 photons. In the range of from the threshold value T(1) to the threshold value T(2), since the probability distribution $P_k(x)$ for 1 photon is the maximum, the photon number corresponding to the pixel value is 1.

The confirmed value deriving unit $22b$ derives the photon number corresponding to the provisional value based on the threshold value data. That is, the confirmed value deriving unit $22b$ identifies as a threshold value range corresponding to the output provisional value and outputs the photon number corresponding to the identified threshold value rage as the photon number corresponding to the provisional value. As described above, the confirmed value deriving unit $22b$ derives the most probable photon number in the target pixel as the confirmed value of the target pixel.

Figure 6:
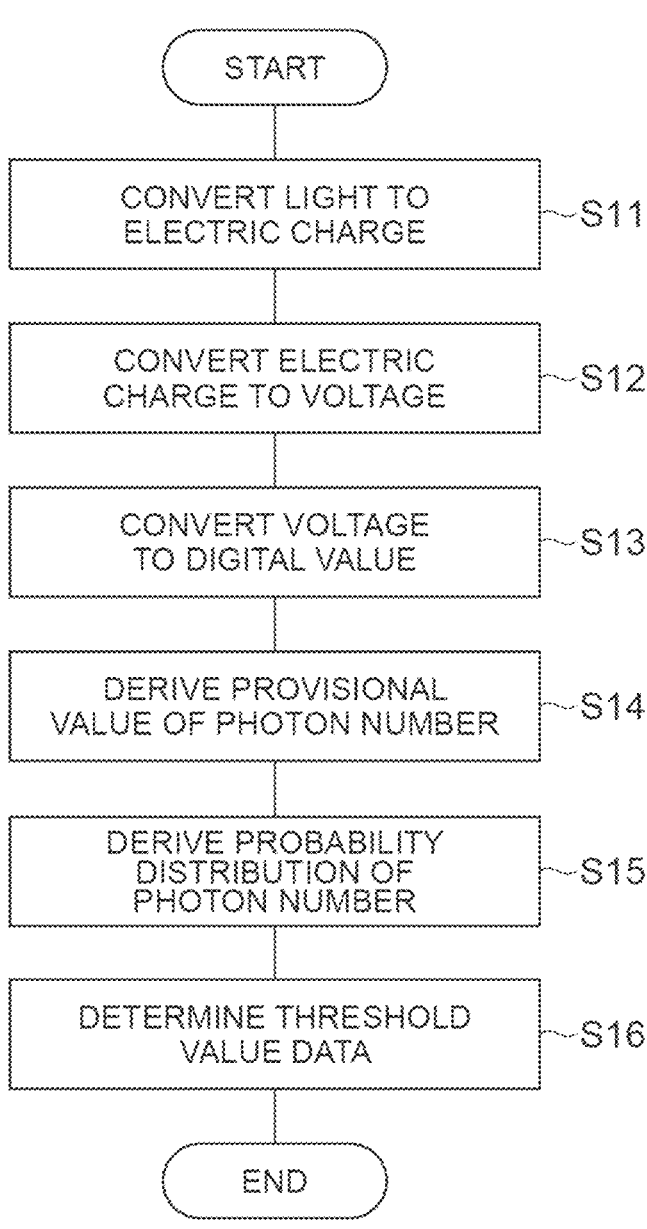
FIG. 6 is a flowchart illustrating an operation flow that is performed by the photon number resolving device according to the example.

FIG. 6 is a flowchart illustrating an example of an operation flow (a threshold value determining method) that is performed by the photon number resolving device. In this embodiment, when measurement is started in a state in which the photon number resolving device 1 is activated, first, photons incident on a pixel 11 of the CMOS image sensor 10 are converted to electric charges by the photodiode 12 (Step S11). Then, the converted electric charges are converted to a voltage by the amplifier 13 (Step S12). The voltage is converted to a digital value by the A/D converter 15 and is output to the computer 20 (Step S13).

The provisional value deriving unit $22a$ of the conversion unit 22 derives a provisional value from the digital value based on a gain and an offset value of each pixel acquired with reference to the table in the storage unit 21 (Step S14). The derived provisional value may be stored, for example in the storage unit 21. Subsequently, the probability deriving unit $22c$ derives a probability distribution $P_k(x)$ (Step S15). That is, the probability deriving unit $22c$ derives an average photon number of each pixel based on the provisional value and derives the probability distribution $P_k(x)$ based on the derived average photon number and reading noise of each pixel acquired with reference to a table in the storage unit 21. Subsequently, the threshold value determining unit $22d$ derives threshold value data for sorting a pixel value of each pixel in a corresponding photon number based on the derived probability distribution $P_k(x)$ (Step S16). The derived threshold value data of each pixel may be stored as a threshold value data map, for example, in the storage unit 21.

Figure 7:
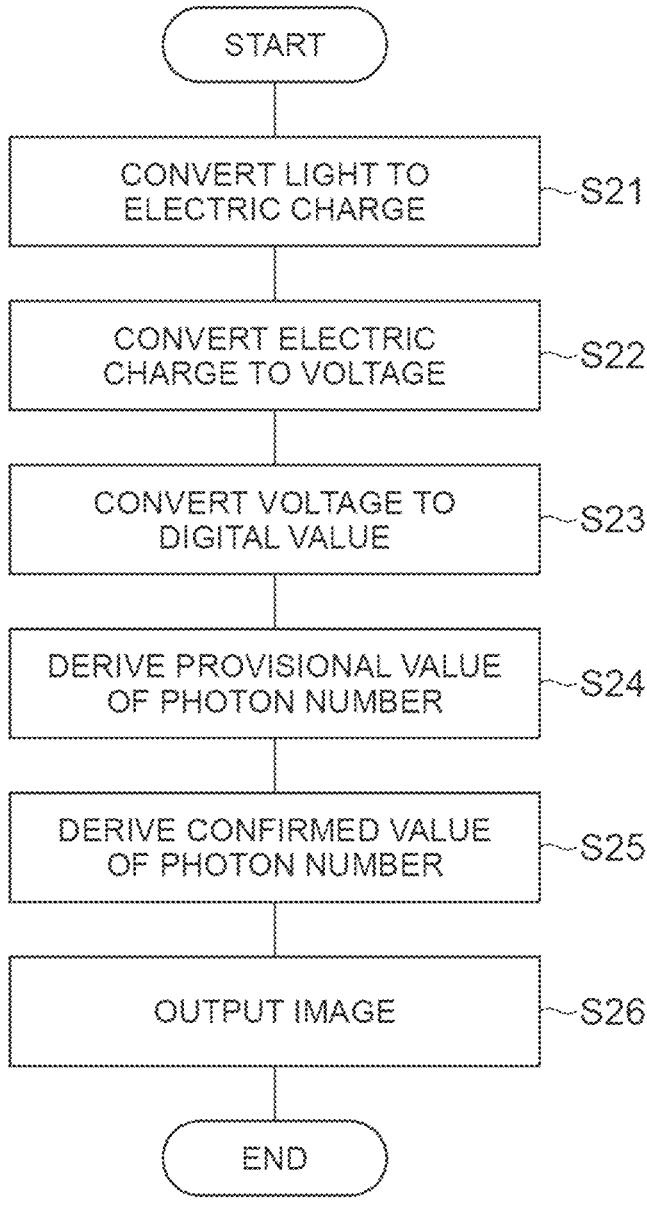
FIG. 7 is a flowchart illustrating an operation flow that is performed by the photon number resolving device according to the example.

FIG. 7 is a flowchart illustrating an example of an operation flow (a photon number resolving method) that is performed by the photon number resolving device. In this embodiment, when measurement is started in a state in which the photon number resolving device 1 is activated, first, photons incident on a pixel 11 of the CMOS image sensor 10 are converted to electric charges by the photodiode 12 (Step S21). Then, the converted electric charges are converted to a voltage by the amplifier 13 (Step S22). The voltage is converted to a digital value by the A/D converter 15 and is output to the computer 20 (Step S23). The provisional value deriving unit $22a$ of the conversion unit 22 derives a provisional value from the digital value based on a gain and an offset value of each pixel acquired with reference to a table in the storage unit 21 (Step S24). Subsequently, the confirmed value deriving unit $22b$ derives the photon number corresponding to the pixel value as a confirmed value of the photon umber in each pixel based on threshold value data stored in the storage unit 21 (Step S25). As described above, the photon number for each of a plurality of pixels is measured. The measurement result (photon number resolving data) is output, for example, as image data to the display device 25 (Step S26).

Figure 8:
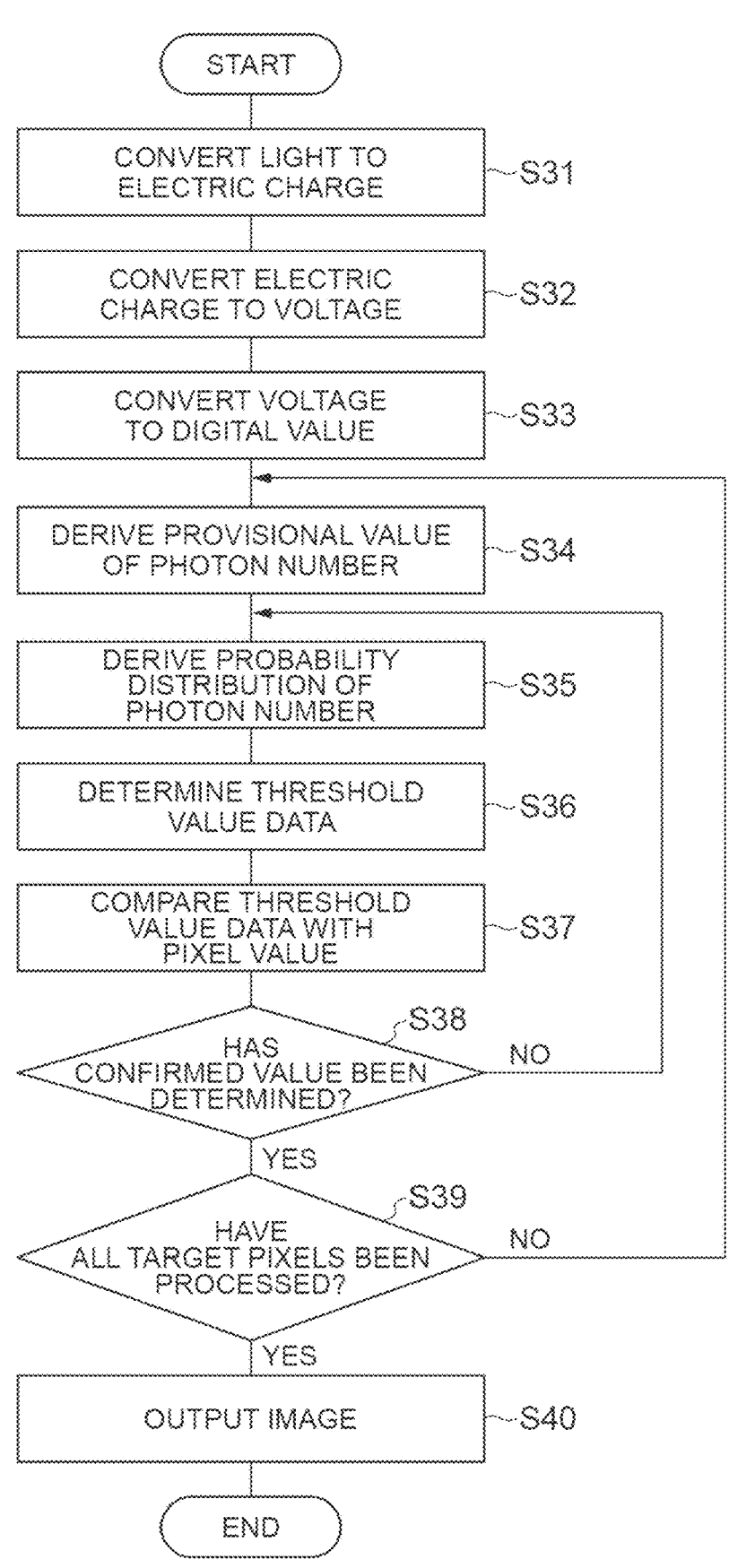
FIG. 8 is a flowchart illustrating an operation flow that is performed by the photon number resolving device according to the example.

FIG. 8 is a flowchart illustrating an example of an operation flow (a real-time process) that is performed by the photon number resolving device. In the real-time process according to this example, the threshold value determining process and the photon number resolving process can be performed as a series of operations. In this embodiment, when measurement is started in a state in which the photon number resolving device 1 is activated, first, photons incident on a pixel 11 of the CMOS image sensor 10 are converted to electric charges by the photodiode 12 (Step S31). Then, the converted electric charges are converted to a voltage by the amplifier 13 (Step S32). The voltage is converted to a digital value by the A/D converter 15 and is output to the computer 20 (Step S33).

The provisional value deriving unit $22a$ of the conversion unit 22 derives provisional values of a target pixel and neighboring pixels from the digital values based on gains and offset values of the pixels acquired with reference to a table in the storage unit 21 (Step S34). The derived provisional values may be stored, for example, in the storage unit 21. Subsequently, the probability deriving unit $22c$ derives probability distributions for different photon numbers (Step S35). For example, the probability deriving unit $22c$ derives an average photon number of the target pixel based on the provisional values and derives a probability distribution $P_{k0}(x)$ of an assumed photon number $k_0$ (for example, 0 photons) based on the derived average photon number and reading noise of the pixels acquired with reference to a table in the storage unit 21. The probability deriving unit $22c$ derives a probability distribution $P_{k1}(x)$ of an assumed photon number $k_1$ (for example, 1 photon) which is next to the assumed photon number $k_0$. Subsequently, the threshold value determining unit $22d$ derives threshold value data $T(k_0)$ for distinguishing the photon number $k_0$ and the photon number $k_1$ based on the probability distribution $P_{k0}(x)$ and the probability distribution $P_{k1}(x)$ (Step S36).

Subsequently, the confirmed value deriving unit $22b$ of the photon number resolving device 1 compares the threshold value data derived in Step S36 and the pixel value of the target pixel (Step S37) and determines a confirmed value based on the threshold value data (Step S38). As in the aforementioned example, when the threshold value data for distinguishing 0 photons and 1 photon is acquired, the confirmed value deriving unit $22b$ acquires $k_0$ as the confirmed value of the photon number of the target pixel when $x \leq T(k_0)$ is satisfied. On the other hand, when $T(k_0) < x$ is satisfied, $k_0$ is not acquired as the confirmed value of the photon number of the target pixel. When the photon number is not confirmed, the confirmed value deriving unit $22b$ compares threshold value data for sorting a next photon number with the pixel value. In the aforementioned example, the threshold value determining unit $22d$ derives a probability distribution $P_{k2}(x)$ of the next photon number $k_2$ and derives threshold value data $T(k_1)$ for distinguishing the photon number $k_1$ and the photon number $k_2$ based on the probability distribution $P_{k1}(x)$ and the probability distribution $P_{k2}(x)$. In this example, since the photon number is not confirmed based on the threshold value data for distinguishing 0 photons and 1 photon, the next photon number $k_2$ is 2. That is, the derived threshold value data $T(k_i)$ is data for distinguishing 1 photon and 2 photons.

The confirmed value deriving unit $22b$ compares the threshold value data $T(k_i)$ with the pixel value x and determines whether $k_i$ is the confirmed value. Since $T(k_0) < x$ is already determined, the confirmed value deriving unit $22b$ actually determines whether $T(k_0) < x \leq T(k_i)$ is satisfied. When $T(k_0) < x \leq T(k_i)$ is satisfied, $k_i$ is confirmed as the photon number of the target pixel. When $T(k_0) < x \leq T(k_i)$ is not satisfied, the assumed photon number is increased by 1 and the processes of Steps S35 to S38 are repeated until the photon number of the target pixel is confirmed. Then, it is determined whether the confirmed value has been determined for all the target pixels (Step S39). When the process for all the target pixels has not ended, the processes of Step S34 and processes subsequent thereto are performed on the target pixels not yet processed. When the process for all the target pixels has ended, the measurement results of the pixels (the photon number resolving data) are output, for example, as image data to the display device 25 (Step S40).

In the example illustrated in FIG. 8, the provisional values of the target pixel and the neighboring pixels are derived in Step S34, but provisional values of all the pixels or desired pixels, that is, all the target pixels, may be derived in Step S34. In this case, when it is determined in Step S39 that the process for all the target pixels has not ended, the processes of Step S35 and steps subsequent thereto may be performed on a target pixel not yet processed.

Figure 9:
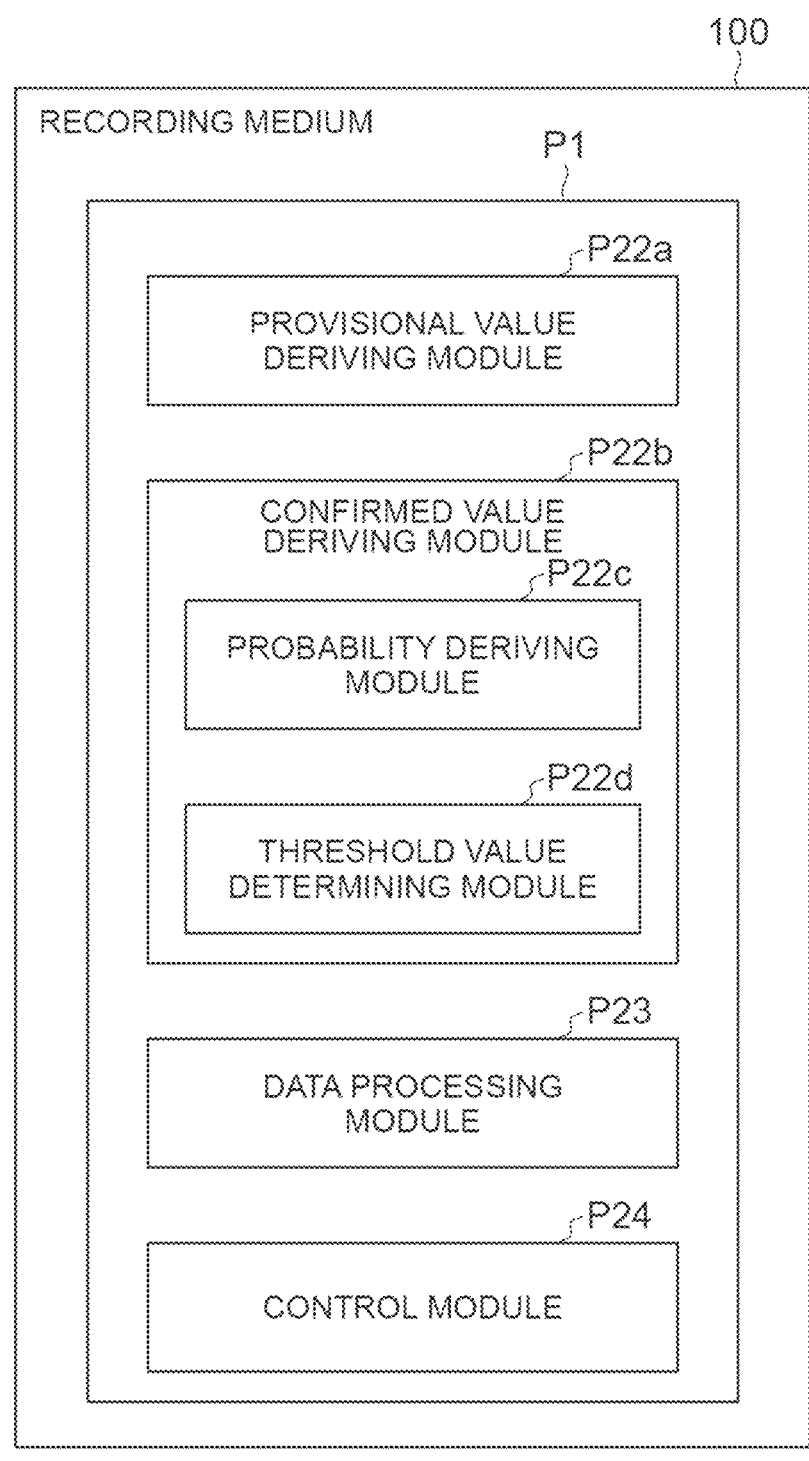
FIG. 9 is a diagram illustrating a photon number resolving processing program.

FIG. 9 is a diagram illustrating a recording medium 100 in which a program causing a computer to perform the threshold value determining process and the photon number resolving process is stored. A processing program (a threshold value determining program and a photon number resolving processing program) P1 stored in the recording medium 100 includes a provisional value deriving module P22a, a confirmed value deriving module P22b, a data processing module P23, and a control module P24. The confirmed value deriving module P22b includes a probability deriving module P22c and a threshold value determining module P22d. Functions (processes) which are realized by executing the provisional value deriving model P22a, the confirmed value deriving module P22b, the probability deriving module P22c, the threshold value determining module P22d, the data processing module P23, and the control module P24 are the same as the functions (processes) of the provisional value deriving unit 22a (a first deriving process), the confirmed value deriving unit 22b (a second deriving process), the probability deriving unit 22c, the threshold value determining unit 22d, the data processing unit 23, and the control unit 24.

The processing program P1 is recorded in a program recording area of a computer-readable recording medium 100. The recording medium 100 may be a non-transitory recording medium. The recording medium 100 is constituted, for example, by a recording medium such as a CD-ROM, a DVD, a ROM, or a semiconductor memory. The processing program P1 may be provided as a computer data signal superimposed on a carrier via a communication network.

As described above, the photon number determination device 1 according to an example includes: a plurality of pixels 11 of which each includes a photodiode 12 for converting input light to electric charges and an amplifier 13 for amplifying the electric charges converted by the photodiode 12 and converting the electric charges to a voltage; an A/D converter 15 configured to convert a voltage output from the amplifier 13 of each of the plurality of pixels 11 to a digital value; a provisional value deriving unit 22a configured to derive a provisional value of a photon number (for example, a pixel value) in each of the plurality of pixels 11 based on the digital value; and a confirmed value deriving unit 22b configured to derive a photon number corresponding to the provisional value based on threshold value data for sorting the provisional value of a target pixel which is one of a plurality of pixels in a corresponding photon number. The threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number of light and an observation probability for each photoelectron number based on a probability distribution of the photoelectron number accompanying reading noise of the target pixel.

A threshold value determination method according to an example in the photon number resolving is a method of deriving threshold value data for sorting a provisional value of a photon number in a target pixel which is one of a plurality of pixels 11 in a corresponding photon number. This method includes a step of calculating a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel and a step of calculating threshold value data for sorting the provisional value into the integer n or the integer m based on the first probability distribution and the second probability distribution.

In the threshold value determination method, the first probability distribution and the second probability distribution are calculated based on the observation probability for each photoelectron number based on the probability distribution of the photon number and the observation probability for each photoelectron number based on the probability distribution of the photoelectron number accompanying the reading noise of the target pixel. The threshold value data is derived based on the first probability distribution and the second probability distribution. In the photon number resolving system, the provisional value is sorted in the corresponding photon number based on the threshold value data derived described above.

For example, in a pixel with large reading noise, an error included in the derived provisional value may increase. In this case, when it is intended to derive the confirmed value of the photon number from the provisional value, accuracy of the confirmed value is considered to decrease according to the error included in the provisional value. However, the threshold value data used in the photon number resolving system according to this example is derived in consideration of the magnitude of the reading noise in the target pixel. Accordingly, since an influence of the reading noise on deriving of the confirmed value can be decreased, it is possible to improve accuracy of photon number resolving. With the photon number resolving device, since the confirmed value can be determined through comparison between the derived threshold value data and the provisional value, it is possible to shorten the process time.

For example, the integer m satisfies m=n+1. With this configuration, a threshold value for distinguishing provisional values of which the photon numbers are different by "1" is derived.

For example, the first probability distribution and the second probability distribution may be derived based on a product of the observation probability for each photoelectron number based on the probability distribution of the photon number and the observation probability for each photoelectron number based on the probability distribution of the photoelectron number accompanying the reading noise of the target pixel. With this configuration, it is possible to appropriately describe the first probability distribution and the second probability distribution.

While an embodiment has been described above in detail with reference to the drawings, a specific configuration is not limited to the embodiment.

For example, in the aforementioned embodiments, the first probability is derived based on the probability distribution of the photoelectron number accompanying the optical shot noise such as a poissonian distribution, but the first probability has only to be derived based on the probability distribution of the photoelectron number accompanying a photon number distribution of light.

For example, when the probability distribution of the photoelectron number accompanying the photon number distribution of light can be estimated based on the type of a light source, the first probability may be derived based on the probability distribution corresponding to the light source. For example, when the light source is a non-coherent light source such as an LED or a thermal photon source, the first probability may be derived based on a super-poissonian distribution which is a photon number distribution in which fluctuation of the photon number is greater than that in the poissonian distribution. When the light source is a quantum light source, the first probability may be derived based on a sub-poissonian distribution which is a photon number distribution in which fluctuation of the photon number is less than that of the poissonian distribution. In this case, the first probability may be derived based on a photon number distribution indicated by a photon number squeezed state (for example, a Fock state) of a signal photon source or the like, or the first probability may be derived based on the photon number distribution indicated by a quantum-entangled photon state (for example, a NOON state) which is generated through spontaneous parametric down conversion (SPDC) or the like. The first probability may be derived based on a complex photon number distribution generated by a combination of modes (that is, a photon number distribution of multi-mode squeezed states) in a complex photon state using a quantum light source. When the light source is a thermal light source or a pseudo-thermal light source, the first probability may be derived based on a Bose-Einstein distribution. The first probability may be derived based on a logarithmic normal (log-normal) distribution having a shape in which a tail extends on a larger numerical value side, a uniform distribution which is a distribution in which the probabilities for the photon numbers are uniform, a mixed distribution which is a distribution in which a plurality of photon number distributions are combined (mixture of multiple photon distributions), or the like.

In this way, the observation probability for each photoelectron number based on the probability distribution of the photon number may be one of a poissonian distribution, a super-poissonian distribution, a sub-poissonian distribution, a photon number distribution in a multi-mode squeezed state, a Bose-Einstein distribution, a logarithmic normal distribution, a uniform distribution, and a mixed distribution. When the probability distribution can be estimated, it is possible to acquire an ideal probability distribution.

The observation probability for each photoelectron number based on the probability distribution of the photon number may be derived based on a digital value of a reference pixel when light is input to the reference pixel by the confirmed value deriving unit 22b. With this configuration, since the observation probability is derived based on the digital value which is measured data, a light source for inputting light to the photoelectric conversion element is not selected. For example, the reference pixel is at least one pixel of the plurality of pixels 11 constituting the CMOS image sensor 10. For example, the reading noise of the reference pixel may have a value smaller than an average of the reading noise of all the plurality of pixels 11. In this case, the provisional value calculated from the digital value of the reference pixel can reflect the photon number with higher accuracy in comparison with the provisional value of a pixel with average reading noise. For example, the reading noise of the reference pixel may be equal to or less than a predetermined value. For example, the reading noise of the reference pixel may be equal to or less than 0.8 [e-rms]. When it is intended to acquire a more accurate probability distribution of the photon number, only pixels 11 of which reading noise is equal to or less than 0.3 [e-rms] may be used as the reference pixel.

In this case, for example, the storage unit 21 may store address information of some or all of the pixels 11 with reading noise suitable for the reference pixel. In this case, the confirmed value deriving unit 22b can identify the reference pixel with reference to the address information in the storage unit 21. Accordingly, the confirmed value deriving unit 22b can appropriately acquire output data such as a digital value, a pixel value, and a provisional photon number of the reference pixel. When address information of the reference pixel is not stored in the storage unit 21, the confirmed value deriving unit 22b may extract output data of a pixel (that is, a reference pixel) with reading noise suitable for the reference pixel with reference to the reading noise of the pixels (a noise map).

For example, the confirmed value deriving unit 22b may derive a probability distribution of the photon number based on output data of a plurality of reference pixels. For example, the output data of the plurality of reference pixels is acquired in a state in which light of a uniform light intensity from the light source is input to the plurality of reference pixels. When light of a uniform light intensity from the light source is input to all the pixels 11 of the CMOS image sensor 10, all the reference pixels may be used to derive the probability distribution of the photon number. When light of a uniform light intensity from the light source is input to pixels 11 in a partial area including the target pixel in the CMOS image sensor 10, only the reference pixels included in the partial area may be used to derive the probability distribution of the photon number.

For example, the confirmed value deriving unit 22b may acquire data of a plurality of pieces of data of the provisional photon number corresponding to each of the plurality of reference pixels. Then, the confirmed value deriving unit 22b may derive a probability distribution of the photon number by statistically processing the acquired plurality of pieces of data of the provisional photon number. That is, the confirmed value deriving unit 22b can derive a probability distribution indicating an observation probability for each provisional photon number (that is, a probability distribution of the photon number) by counting the acquired pieces of data of the provisional photon number for each provisional photon number and dividing the counting result by the total number of pieces of data. The confirmed value deriving unit 22b acquires a first probability based on the probability distribution. The first probability is a probability with which the photon number of the target pixel is observed to be k when uniform light under the same conditions as when the probability distribution of the photon number is acquired is input to the target pixel. That is, the confirmed value deriving unit 22b acquires a probability when the photon number is k as the first probability from the probability distribution of the photon number.

When the probability distribution of the photon number is derived, a result with higher accuracy can be obtained as the number of pieces of data of the provisional photon number becomes larger, that is, as the sample size becomes larger. Therefore, the confirmed value deriving unit 22b may acquire data of the provisional photon number corresponding to a plurality of frames and derive the probability of the photon number based on the acquired data.

The weight for calculating the average photon number using the weighted average is not limited to the examples of the aforementioned embodiments. When a weight for decreasing an error between the average photon number based on the weighted average and the true photon number is used as the weight for calculating the average photon number, a weight which is calculated as follows may be used. The true photon number may be an arithmetic mean of the true photon numbers of the neighboring pixels.

When the weight w for decreasing an error between the average photon number $\lambda^*$ based on a weighted average and the true average photon number $\lambda$ is calculated, the weight w for minimizing an expected value $E[(\lambda^*-\lambda)^2]$ of a square error between $\lambda^*$ and $\lambda$ can be calculated. First, an expected value $E[\lambda^*]$ of $\lambda^*$ is calculated. The pixel value x conforms to the probability distribution p(x) expressed by Expression (8).

[Math. 8]

$$p(x) = \sum_k \frac{e^{-\lambda}\lambda^k}{k!} \frac{1}{\sqrt{2\pi R^2}} \exp\left\{-\frac{(x-k)^2}{2R^2}\right\} \tag{8}$$

By calculating the expected value based on the probability distribution, $E[\lambda^*]=\lambda$ is obtained, and the expected value of $\lambda^*$ matches $\lambda$ regardless of the weight w. Expression (9) is derived by subsequently calculating $E[(\lambda^*-\lambda)^2]$.

[Math. 9]

$$E[(\lambda^* - \lambda)^2] = \frac{\sum_i (\lambda + R_i^2)w_i^2}{(\sum_i w_i)^2} \tag{9}$$

A weight $w_i$ for minimizing Expression (9) is calculated. Expression (10) is obtained by differentiating this expression with respect to $w_j$ and setting the value to zero.

[Math. 10]

$$\left(\sum_i w_i\right)(\lambda + R_j^2)w_j - \sum_i (\lambda + R_i^2)w_i^2 = 0 \tag{10}$$

Expression (11) is obtained by rewriting the expression with respect to j=0.

[Math. 11]

$$\left(\sum_i w_i\right)(\lambda + R_j^2)w_0 - \sum_i (\lambda + R_i^2)w_i^2 = 0 \tag{11}$$

Expression (12) is obtained by calculating a difference between the sides when j≠0, and Expression (13) is derived.

[Math. 12]

$$\left(\sum_i w_i\right)\{(\lambda + R_j^2)w_j - (\lambda + R_0^2)w_0\} = 0 \tag{12}$$

[Math. 13]

$$w_j = \frac{\lambda + R_0^2}{\lambda + R_j^2} w_0 \tag{13}$$

Here, Expression (15) is satisfied for all values of i, for example, by defining $w_0$ as expressed by Expression (14). In this case, the average photon number $\lambda^*$ based on a weighted average is expressed by Expression (16).

[Math. 14]

$$w_0 = \frac{1}{\lambda + R_0^2} \tag{14}$$

[Math. 15]

$$w_i = \frac{1}{\lambda + R_i^2} \tag{15}$$

[Math. 16]

$$\lambda^* = \frac{\sum_i \frac{x_i}{\lambda + R_i^2}}{\sum_i \frac{1}{\lambda + R_i^2}} \tag{16}$$

Since the true average photon number $\lambda$ is included in Expression (15), Expression (15) cannot be calculated without any change. Therefore, for example, $w_i$ which is derived based on Expression (15) may be used as a weight based on the assumption that the average photon number calculated as an unweighted average of the neighboring pixels is defined as $\lambda$.

$w_i$ which is derived based on Expression (15) may be self-consistently resolved. That is, processes of calculating the average photon number by substituting the derived weight $w_i$ into Expression (16) and deriving the weight $w_i$ from Expression (15) using the average photon number may be repeated. Based on approximation between the average photon number $\lambda^*$ corresponding to the weighted average and the true average photon number $\lambda$, a solution of Expression (17) may be defined as the average photon number. Here, the solution can be obtained from Expression (18) when the function of the right side is reduction mapping using a fixed point theorem.

[Math. 17]

$$\lambda^* = \frac{\sum_i \frac{x_i}{\lambda^* + R_i^2}}{\sum_i \frac{1}{\lambda^* + R_i^2}} \tag{17}$$

[Math. 18]

$$\lambda_{k+1}^* = \frac{\sum_i \frac{x_i}{\lambda_k^* + R_i^2}}{\sum_i \frac{1}{\lambda_k^* + R_i^2}} \tag{18}$$

The average photon number of the target pixel may be derived based on data of the provisional values of a plurality of frames. That is, the confirmed value deriving unit 22b may acquire data of the provisional values in a plurality of pixels corresponding to a plurality of frames and derive the average photon number based on the acquired data. For example, the confirmed value deriving unit 22b may derive the average photon number of the target pixel for each of the acquired frames and calculate the first probability using an average value of the derived average photon numbers as λ. The confirmed value deriving unit 22b may derive the average photon number of the target pixel using the acquired data of the provisional values corresponding to the plurality of frames as one parent population and calculate the first probability using the derived average photon number as λ. The confirmed value deriving unit 22b may calculate an average value of the provisional values for each pixel in the acquired frames and derive the average photon number using the average value as the provisional value of each pixel.

REFERENCE SIGNS LIST

1 . . . Photon number resolving device, 11 . . . Pixel, 12 . . . Photodiode (photoelectric conversion element), 13 . . . Amplifier, 15 . . . A/D converter, 21 . . . Storage unit, 22a . . . Provisional value deriving unit (first deriving unit), 22b . . . Confirmed value deriving unit (second deriving unit)

The invention claimed is:

1. A threshold value determination method of deriving threshold value data for sorting a provisional value of a photon number in a target pixel which is one of a plurality of pixels in a corresponding photon number in a photon number resolving system including the plurality of pixels of which each includes a photoelectric conversion element for converting input light to electric charges and an amplifier for amplifying the electric charges converted by the photoelectric conversion element and converting the electric charges to a voltage, an A/D converter configured to convert a voltage output from the amplifier of each of the plurality of pixels to a digital value, and a deriving unit configured to derive the provisional value of the photon number in each pixel of the plurality of pixels based on the digital value, the method comprising:

a step of calculating a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel; and a step of calculating threshold value data for sorting the provisional value into the integer n or the integer m based on the first probability distribution and the second probability distribution.

2. The threshold value determination method according to claim 1, wherein the integer m satisfies m=n+1.

3. The threshold value determination method according to claim 1, wherein the observation probability for each photoelectron number based on the probability distribution of the photon number is one of a poissonian distribution, a super-poissonian distribution, a sub-poissonian distribution, a photon number distribution in a multi-mode squeezed state, a Bose-Einstein distribution, a logarithmic normal distribution, a uniform distribution, and a mixed distribution.

4. The threshold value determination method according to claim 1, wherein the first probability distribution and the second probability distribution are derived based on a product of the observation probability for each photoelectron number based on the probability distribution of the photon number and the observation probability for each photoelectron number based on the probability distribution of the photoelectron number accompanying the reading noise of the target pixel.

5. The threshold value determination method according to claim 1, wherein the observation probability for each photoelectron number based on the probability distribution of the photon number is derived based on the digital value when the light is input to a reference pixel which is at least one pixel of the plurality of pixels.

6. A non-transitory storage medium that stores a threshold value determination program, the program causing a computer to perform a process of deriving threshold value data for sorting a provisional value of a photon number in a target pixel which is one of a plurality of pixels in a corresponding photon number in a photon number resolving system including the plurality of pixels of which each includes a photoelectric conversion element for converting input light to electric charges and an amplifier for amplifying the electric charges converted by the photoelectric conversion element and converting the electric charges to a voltage, an A/D converter configured to convert a voltage output from the amplifier of each of the plurality of pixels to a digital value, and a deriving unit configured to derive the provisional value of the photon number in each pixel of the plurality of pixels based on the digital value, the process of deriving threshold value data comprising:

a process of calculating a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel; and a process of calculating threshold value data for sorting the provisional value into the integer n or the integer m based on the first probability distribution and the second probability distribution.

7. The non-transitory storage medium according to claim 6, wherein the integer m satisfies m=n+1.

8. The non-transitory storage medium according to claim 6, wherein the observation probability for each photoelectron number based on the probability distribution of the photon number is one of a poissonian distribution, a super-poissonian distribution, a sub-poissonian distribution, a photon number distribution in a multi-mode squeezed state, a Bose-Einstein distribution, a logarithmic normal distribution, a uniform distribution, and a mixed distribution.

9. The non-transitory storage medium according to claim 6, wherein the first probability distribution and the second probability distribution are derived based on a product of the observation probability for each photoelectron number based on the probability distribution of the photon number and the observation probability for each photoelectron number based on the probability distribution of the photoelectron number accompanying the reading noise of the target pixel.

10. The non-transitory storage medium according to claim 6, wherein the observation probability for each photoelectron number based on the probability distribution of the photon number is derived based on the digital value when the light is input to a reference pixel which is at least one pixel of the plurality of pixels.

11. A threshold value determination device comprising:
a plurality of pixels of which each includes a photoelectric conversion element for converting input light to electric charges and an amplifier for amplifying the electric charges converted by the photoelectric conversion element and converting the electric charges to a voltage;
an A/D converter configured to convert a voltage output from the amplifier of each of the plurality of pixels to a digital value;
a first deriving unit configured to derive a provisional value of a photon number in each pixel of the plurality of pixels based on the digital value; and
a second deriving unit configured to derive threshold value data for sorting the provisional value of the photon number in a target pixel which is one of a plurality of pixels in a corresponding photon number,
wherein the second deriving unit includes:
a probability deriving unit configured to calculate a first probability distribution of the provisional value with which the photon number in the target pixel is an integer n (where n is equal to or greater than 0) and a second probability distribution of the provision value with which the photon number in the target pixel is an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel; and
a threshold value determining unit configured to determine threshold value data for sorting the provisional value into the integer n and the integer m based on the first probability distribution and the second probability distribution.

12. The threshold value determination device according to claim 11, wherein the integer m satisfies m=n+1.

13. The threshold value determination device according to claim 11, wherein the observation probability for each photoelectron number based on the probability distribution of the photon number is one of a poissonian distribution, a super-poissonian distribution, a sub-poissonian distribution, a photon number distribution in a multi-mode squeezed state, a Bose-Einstein distribution, a logarithmic normal distribution, a uniform distribution, and a mixed distribution.

14. The threshold value determination device according to claim 11, wherein the first probability distribution and the second probability distribution are derived based on a product of the observation probability for each photoelectron number based on the probability distribution of the photon number and the observation probability for each photoelectron number based on the probability distribution of the photoelectron number accompanying the reading noise of the target pixel.

15. The threshold value determination device according to claim 11, wherein the observation probability for each photoelectron number based on the probability distribution of the photon number is derived based on the digital value when the light is input to a reference pixel which is at least one pixel of the plurality of pixels.

16. A photon number resolving system comprising:
a plurality of pixels of which each includes a photoelectric conversion element for converting input light to electric charges and an amplifier for amplifying the electric charges converted by the photoelectric conversion element and converting the electric charges to a voltage;
an A/D converter configured to convert a voltage output from the amplifier of each of the plurality of pixels to a digital value;
a first deriving unit configured to derive a provisional value of a photon number in each pixel of the plurality of pixels based on the digital value; and
a second deriving unit configured to derive a photon number corresponding to the provisional value based on threshold value data for sorting the provisional value of the photon number in a target pixel which is one of a plurality of pixels in a corresponding photon number,
wherein the threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

17. A photon number resolving method comprising:
a step of deriving a provisional value of a photon number in each of a plurality of pixels based on digital values corresponding to the plurality of pixels output from a two-dimensional image sensor including the plurality of pixels; and
a step of deriving a photon number corresponding to the provisional value based on threshold value data for sorting the provisional value of the photon number in a target pixel which is one of a plurality of pixels in a corresponding photon number,
wherein the threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

18. A non-transitory storage medium that stores a photon number resolving processing program, the program causing a computer to perform a photon number resolving process based on digital values corresponding to a plurality of pixels output from a two-dimensional image sensor including the plurality of pixels, the program causing the computer to perform:
a process of deriving a provisional value of a photon number of each pixel of the plurality of pixels based on the digital values; and
a process of deriving a photon number corresponding to the provisional value based on threshold value data for sorting the provisional value of the photon number in a target pixel which is one of a plurality of pixels in a corresponding photon number, wherein the threshold value data is threshold value data for sorting the provisional value into an integer n (where n is equal to or greater than 0) or an integer m (where m is equal to or greater than 0 and is not equal to n) based on an observation probability for each photoelectron number based on a probability distribution of the photon number and an observation probability for each photoelectron number based on a probability distribution of the photoelectron number accompanying reading noise of the target pixel.

* * * * *